US012062262B2

(12) United States Patent
Ladaru et al.

(10) Patent No.: US 12,062,262 B2
(45) Date of Patent: Aug. 13, 2024

(54) PHOTOELECTRIC SYSTEM AND METHOD FOR OPTIMISING THE MONITORING OF A CHIP GAME PRACTICED IN A CASINO

(71) Applicants: Cosmin Alexandru Ladaru, Otopeni (RO); Bogdan Ioan Gauzin, Bucharest (RO)

(72) Inventors: Cosmin Alexandru Ladaru, Otopeni (RO); Bogdan Ioan Gauzin, Bucharest (RO)

( * ) Notice: Subject to any disclaimer, the term of this patent is extended or adjusted under 35 U.S.C. 154(b) by 190 days.

(21) Appl. No.: 17/327,714

(22) Filed: May 22, 2021

(65) Prior Publication Data

US 2022/0051522 A1 Feb. 17, 2022

(30) Foreign Application Priority Data

Aug. 13, 2020 (RO) .............................. a 2020 00513

(51) Int. Cl.
*G07F 17/32* (2006.01)

(52) U.S. Cl.
CPC ...... *G07F 17/3241* (2013.01); *G07F 17/3206* (2013.01); *G07F 17/322* (2013.01); *G07F 17/3248* (2013.01)

(58) Field of Classification Search
CPC ............. G07F 17/3241; G07F 17/3206; G07F 17/322; G07F 17/3248; G07F 17/3227
See application file for complete search history.

(56) References Cited

U.S. PATENT DOCUMENTS 9,779,584 B1 * 10/2017 Czubak ............... G07F 17/3227
2007/0045958 A1 * 3/2007 Rader ..................... G07F 17/32 273/274
2009/0023492 A1 * 1/2009 Erfanian ............... G07F 17/322 463/23
2012/0208622 A1 * 8/2012 Delaney ................ G07F 17/322 463/25
2014/0378203 A1 * 12/2014 Board ................. G07F 17/3237 463/17
2017/0178458 A1 * 6/2017 Morin ................. G07F 17/3293
2018/0075698 A1 * 3/2018 Shigeta .............. G01B 11/0608

FOREIGN PATENT DOCUMENTS

JP 2008000161 A * 1/2008
RO 131620 A2 * 1/2017

* cited by examiner

*Primary Examiner* — Jasson H Yoo
(74) *Attorney, Agent, or Firm* — Hershkovitz & Associates, PLLC; Abe Hershkovitz

(57) ABSTRACT

A system and the method implemented by the system is for optimization of monitoring of a game with tokens used in a casino. The system has an optoelectric subsystem which permits both the monitoring of the gaming table, in real time and generate reports necessary for casino management, a subsystem with video camera and a module for identification of counterfeit tokens, a subsystem comprised of a device and module for generating holograms, a subsystem for generating automatic jackpots for bets at live tables made up of a jackpot display and a generating jackpot module, a subsystem for drying the dealer's palms comprising a miniature ventilator and a subsystem for generating synchronized sound made up of a diffuser connected to a sound generating module. The method permits, in addition to the implementation of the functions of the above-mentioned subsystems, also the automatic and fair allocation of dealers at the tables.

15 Claims, 10 Drawing Sheets

Figure 12

| SEQUENCE | STEPS | 1 | 2 | 3 | 4 | 5 | 6 | 1 | 2 | 3 | 4 | 5 | 6 |
|---|---|---|---|---|---|---|---|---|---|---|---|---|---|
| | TIME | 8 | 8:20 | 8:40 | 9 | 9:20 | 9:40 | 10 | 10:20 | 10:40 | 11 | 11:20 | 11:40 |
| 1 | C1 | M1 | M2 | / | M1 | M2 | / | M1 | M2 | / | M1 | M2 | / |
| 2 | C2 | M2 | / | M1 | M2 | / | M1 | M2 | / | M1 | M2 | / | M1 |
| 3 | C3 | / | M1 | M2 | / | M1 | M2 | / | M1 | M2 | / | M1 | M2 |

Figure 13

| | STEPS | 1 | 2 | 3 | 4 | 5 | 1 | 2 | 3 | 4 | 5 | 1 | 2 | 3 | 4 | 5 |
|---|---|---|---|---|---|---|---|---|---|---|---|---|---|---|---|---|
| SEQUENCE | TIME | 8 | 8:20 | 8:40 | 9 | 9:20 | 9:40 | 10 | 10:20 | 10:40 | 11 | 11:20 | 11:40 | 12 | 12:20 | 12:40 |
| 1 | C1 | M1 | / | M2 | M3 | / | M1 | / | M2 | M3 | / | M1 | / | M2 | M3 | / |
| 2 | C2 | M2 | M3 | / | M1 | / | M2 | M3 | / | M1 | / | M2 | M3 | / | M1 | / |
| 3 | C3 | M3 | / | M1 | / | M2 | M3 | / | M1 | / | M2 | M3 | / | M1 | / | M2 |
| 4 | C4 | / | M1 | / | M2 | M3 | / | M1 | / | M2 | M3 | / | M1 | / | M2 | M3 |
| 5 | C5 | / | M2 | M3 | / | M1 | / | M2 | M3 | / | M1 | / | M2 | M3 | / | M1 |

Figure 14

| | Sa | Su | Mo | Tu | We | Th | Fr | Sa | Su | Mo | Tu | We | Th | Fr | Sa | Su | Mo | Tu | We | Th | Fr | Sa | Su | Mo | Tu | We | Th | Fr | Su |
|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| C1 | 8 | 8 | 8 | 8 | 8 | | | 8 | 8 | 8 | 8 | 8 | | | 8 | 8 | 8 | 8 | 8 | | | 8 | 8 | 8 | 8 | 8 | | | 8 |
| C2 | | 8 | 8 | 8 | 8 | 8 | | | 8 | 8 | 8 | 8 | 8 | | | 8 | 8 | 8 | 8 | 8 | | | 8 | 8 | 8 | 8 | 8 | | |
| C3 | | | 8 | 8 | 8 | 8 | 8 | | | 8 | 8 | 8 | 8 | 8 | | | 8 | 8 | 8 | 8 | 8 | | | 8 | 8 | 8 | 8 | 8 | |
| C4 | 8 | | | 8 | 8 | 8 | 8 | 8 | | | 8 | 8 | 8 | 8 | 8 | | | 8 | 8 | 8 | 8 | 8 | | | 8 | 8 | 8 | 8 | 8 |
| C5 | 8 | 8 | | | 8 | 8 | 8 | 8 | 8 | | | 8 | 8 | 8 | 8 | 8 | | | 8 | 8 | 8 | 8 | 8 | | | 8 | 8 | 8 | 8 |
| C6 | 10 | 10 | 10 | | | 10 | 10 | 10 | 10 | 10 | | | 10 | 10 | 10 | 10 | 10 | | | 10 | 10 | 10 | 10 | 10 | | | 10 | 10 | 10 |
| C7 | 10 | 10 | 10 | 10 | | | 10 | 10 | 10 | 10 | 10 | | | 10 | 10 | 10 | 10 | 10 | | | 10 | 10 | 10 | 10 | 10 | | | 10 | 10 |
| C8 | 10 | 10 | 10 | 10 | 10 | | | 10 | 10 | 10 | 10 | 10 | | | 10 | 10 | 10 | 10 | 10 | | | 10 | 10 | 10 | 10 | 10 | | | 10 |
| CN | | | | | | | | | | | | | | | | | | | | | | | | | | | | | |

PHOTOELECTRIC SYSTEM AND METHOD FOR OPTIMISING THE MONITORING OF A CHIP GAME PRACTICED IN A CASINO

CROSS-REFERENCE TO RELATED APPLICATION

This U.S. Patent Application claims priority of Romanian Patent Application No. A/00513 filed Aug. 13, 2020, the disclosure of which is incorporated herein in its entirety by specific reference thereto.

TECHNICAL FIELD

Present invention refers to a photoelectric system and to the method for the optimisation of monitoring of value tokens from casino, of the colour tokens from the roulette game as well as of the betting boxes from the card games.

The system is applicable to games from most casinos, in which the tokens which are located in electronic floats are regularly made from plastic or ceramics, without having incorporated identification chip, being known the disadvantage of using such type of tokens, namely that, as a rule, they do not permit their monitoring in real time or with accuracy the financial situation at the gaming tables nor they prevent their theft for counterfeiting purposes.

BACKGROUND ART

For the purpose of monitoring the regular type tokens from the floats, it is known the solution from the patent document RO 2015 00373 “Photoelectric system for the monitoring of a game with tokens in a casino” which comprises of a system for the monitoring of value tokens without integrated identification chip, on the basis of a specially conceived photoelectric system. The system is made up of at least one float, each containing 1 . . . n rows of value tokens, 1 . . . n rows of colour tokens and 1 . . . n betting boxes from the card games, each of the floats being provided with a concave optic guide in which an electronic module with photoelectric sensors is mounted, for each token, on one side of the float being fitted an own light source constituted by a series of infrared LEDs, one LED for each token, with wavelength from visible, infrared or ultra-violet spectrum, depending on the optic sensors used by system and, on the other side of the float, being fitted colour sensors for the counting and identification of the colour of the tokens.

The signals from the electronic module are processed in a central unit which monitors the financial situation from the gaming table. Although the mentioned photoelectric system offers a reliable technical solution for monitoring the game in a casino, it has nevertheless some functional limitations. Among them, could be mentioned: impossibility of on-line detection of the counterfeit tokens, in spite of the fact that it performs an exact management of each betting box however it does not offer an automatic jack-pot generation, nor a rapid and efficient automatic allocation of dealer and a direct interaction with human factors.

It is also known the technical solution from the patent document US 2006/199649A1, based on the processing of the signals obtained by means of a driving mechanism with reading head, with whom a photograph of the pattern of the margins and of the colour of the tokens is taken, for obtaining a financial result. Technical solution includes one video camera, mounted on the mentioned device for driving the chip reading head through a mobile mechanism through which the optical sensor “walks” along the entire length of the single concave guide and a software solution for methods for learning new chip patterns, based on searching for changes in the color using a color distance operator.

The disadvantage of this device stems on the one hand from its mechanical complexity which in principle makes it less reliable and slower, as it relies on a more complicated processing of the monitoring data and on the other hand the functional principle of the solution, for sequential scrolling of the chip rows by the mobile video camera, makes it possible and in any case cannot eliminate a potential irregular handling of tokens by an incorrect dealer, in the moments when the instant position of the single video camera, does not “cover” its “field of vision.

There are also known technical solutions used in the real-time monitoring of the financial situation, by means of using of chip tokens at the tables, whose principles of functioning and the technique for the identification of information contained in the chip token make them in principle appropriate to the development of functioning methods for the game systems based on processing parallel digital signals. The disadvantage of these solutions stems from the fact that they cannot be applied to regular systems with simple tokens, given the complexity of the data processing architecture and implicitly in the higher functioning and maintenance costs.

The presented systems have some functional limitations stemming, on one part, from the complexity of solutions aiming to identify counterfeit tokens during the game and the automatic generation of jackpot and, on the other part, from the weak interaction between the human factor present at the table and the monitoring system.

For the purpose of automatic generation of jackpot, the technical solution is known from the patent document WO 2012100286A1, which presents a system for generating jackpot at live tables based on the manual insertion by the dealer of the amount used for winning the jackpot.

It is also known the technical solution from the patent document US 2015/099577A1 according to which the data on such bets are manually introduced with a view of automatic generating the jackpot at live tables.

The disadvantages of these systems stem from the fact that the introduction of data is made by man, the human error in these situations being thus possible. In addition, the players must wait until the dealer introduces the data with the keyboard, which supposes additional time for manual introduction of data.

SUMMARY OF INVENTION

The technical solution solved by this system and its corresponding method, as per the claimed invention, is to extend and to optimise the functionality of the current systems for monitoring the tokens from several tables, regardless of the type of tokens, of their colour and of the ambient light, such optimisation being accomplished through automatic and early determination of counterfeit tokens during the game, the automatic generation of jackpot at the live tables and through optimised interaction between the human factor present at the table and the monitoring system.

The system for the optimisation of the monitoring of a chip game in a casino comprises five subsystems S2 . . . S6, which interact with a base subsystem known in itself. Thus, the base subsystem S1 is made up of at least one float, each containing 1 . . . n rows of value tokens, 1 . . . n rows of colour tokens and 1 . . . n betting boxes at the cards games, each of the floats being fitted with a concave optic guide in which an electronic module with photoelectric sensors is mounted, for each token, one side of the float being provided with an own light source made up of a series of infrared LEDs, one LED for each token, with wavelength from visible, infrared or ultraviolet spectrum, depending on the optic sensors used and, on the other side of the float, being mounted colour sensors for the counting and the identification of the colour of the tokens.

In accordance with the widespread practice in casinos, value tokens have a uniquely defined value for that casino, depending on the colour, and represent the exchange currency in a casino. Colour tokens do not have a defined value written and they receive a specific value when the player wants to play a certain colour and to distinguish himself from other players. The value of the colour is given by a plastic marker on which that value is written. These tokens cannot be converted into money at the casino cashier, but only through value tokens.

The concave optic guide facilitates both the propagation of light from the light source and the reflexion and diffraction phenomena.

The electronic module, equipped with optic sensors for the counting and the identification of the colour of the tokens and with photoelectric sensors for the identification of the value of the tokens and of the betting box, contains one microcontroller which takes over the information from the sensors, calculates the balance of the tables and associates such balance with the dealer present at the game table, through a dedicated software application, whose role it to store all data in a central database which permits both the monitoring of the table in real time as well as the generation of reports necessary to the casino management team.

A subsystem for the identification of the counterfeit tokens is destined to identify the edge lettering from the margin of the token, in real time, through a video camera each mounted at each end of the row. By means of a specialised software module specially conceived for video camera, it is observed in real time whether the token is counterfeit or not, without being necessary for the token to reach the cashier desk and to be scrutinized optically by the dealer, thus it is possible to detect the counterfeit tokens directly at the live playing table.

A subsystem for generating holograms relies on the fact that the tokens are individually monitored by means of installing a photoelectric sensor for each token so that, when a jackpot type price is awarded at the live tables, with the help of a device that generates holographic images connected to a system and of a software module it is thus possible to generate basically a multitude of images that offers a new experience to the player, allowing thus the system to be in direct and spontaneous interaction with the human factor.

A subsystem for automatic generation of jackpot following the bets placed at live tables works together with the base subsystem that monitors the float and the betting boxes in real time and achieves a jackpot type bonus system identical to the one generating jackpot at the slot machines. Given that it provides for a balance for each betting box by means of monitoring the tokens that enter and exit the float at each betting session in real time, the subsystem secures the generation of jackpot at the table by incrementing a percentage from each bet placed at the betting box.

A subsystem for drying of dealer's palms is designed to eliminate the unpleasant situation, when the dealer has its palms sweat and has the tendency to wipe them off on the table or on the clothes, through a miniature ventilator installed on the side parts of the float that blows air for the dealer to dry his/her palms.

Lastly, the system incorporates a subsystem for generating a sound synchronised with the movement of the token from the electronic float which, relying on the information that in the base subsystem the tokens are individually monitored each having installed a photoelectric sensor for each token, in the moment when the token enters or exits the float, generates one or more polyphonic sound upon each entrance and exit of the token from the device or upon reaching an amount pre-set by the system with the help of a diffuser connected through which a software module.

The optimised monitoring method implements the abovementioned functions in the system, achieving in addition also the fair allocation of dealers depending on the balance obtained by dealers at the gaming tables and taken into account the corresponding allocation of dealers' working schedule.

The system for the optimisation of monitoring of a game with tokens used in a casino and the corresponding method, as per the invention, presents the following advantages:

- extends the known functions of the current systems;
- permits the finding of counterfeit tokens directly at the playing table;
- generates automatic jackpot, without the intervention of operators given the electronic calculation of the amount played at the betting box, excluding thus the time for the manual introduction of data and minimizing human error;
- allows for fair allocation of dealers based on the balance obtained by each dealer at the playing tables;
- facilitates the interaction man-machine/system by means of generating sounds and images adequately to the gaming and ambient conditions.

BRIEF DESCRIPTION OF DRAWINGS

Herein below there is presented an example of executing the system, according to the invention, in relation to the FIG. 1 . . . 11, which represents:

FIG. 12: The 4-step procedure in Table 1 is repeated;

FIG. 13: The 4-step procedure in Table 1 is repeated for a different scenario; and FIG. 14: The 4-step procedure in Table 1 is repeated depending on the number of tables and of dealers respectively that are available throughout a playing day.

DESCRIPTION OF EMBODIMENTS

Figure 1:
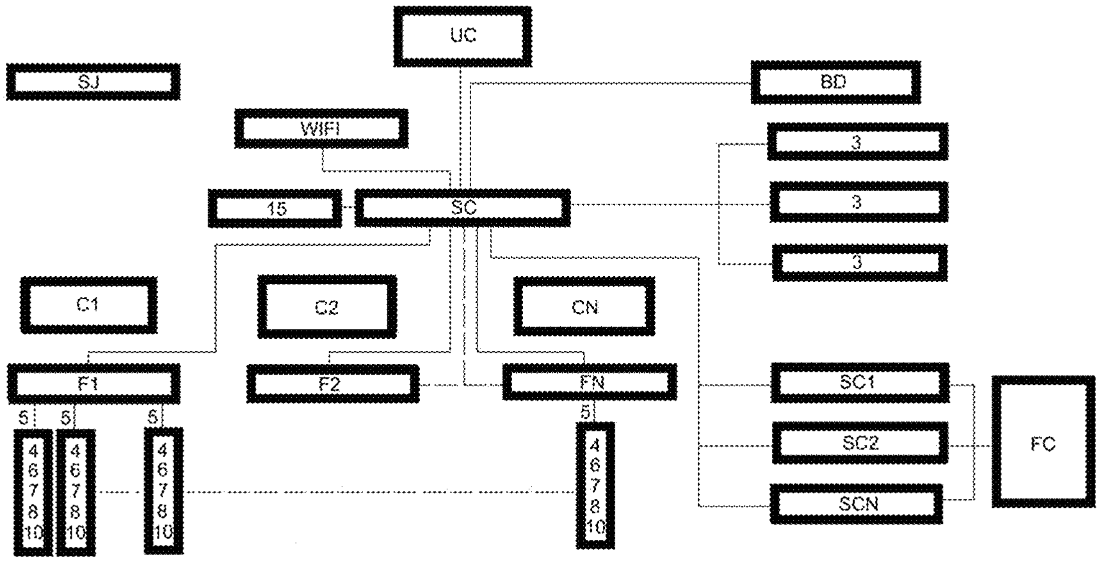
FIG. 1: Block scheme of the base subsystem for the monitoring of a game with tokens practiced in a casino.
Figure 2:
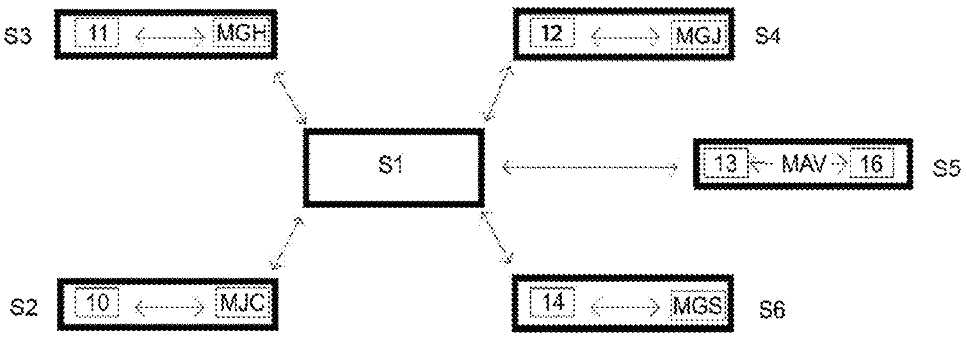
FIG. 2: Block scheme of the optimised photoelectric subsystem for the monitoring of a game with tokens practiced in a casino.
Figure 3:
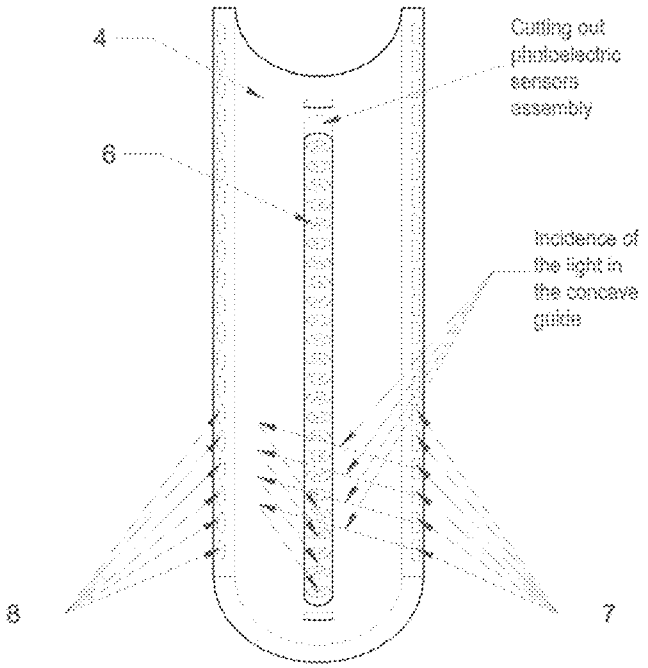
FIG. 3: Float view of the photoelectric system for the monitoring of a game with tokens used in a casino.
Figure 4:
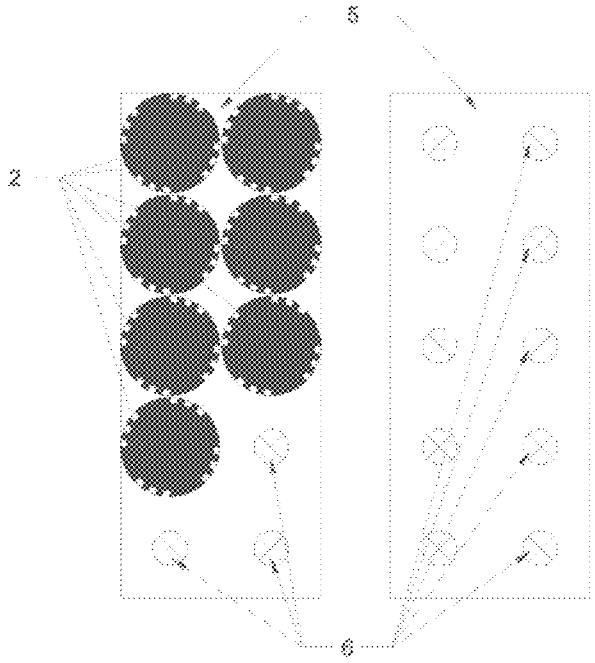
FIG. 4: View placement of sensors of the photoelectric system for the monitoring of a game with coloured tokens.
Figure 5:
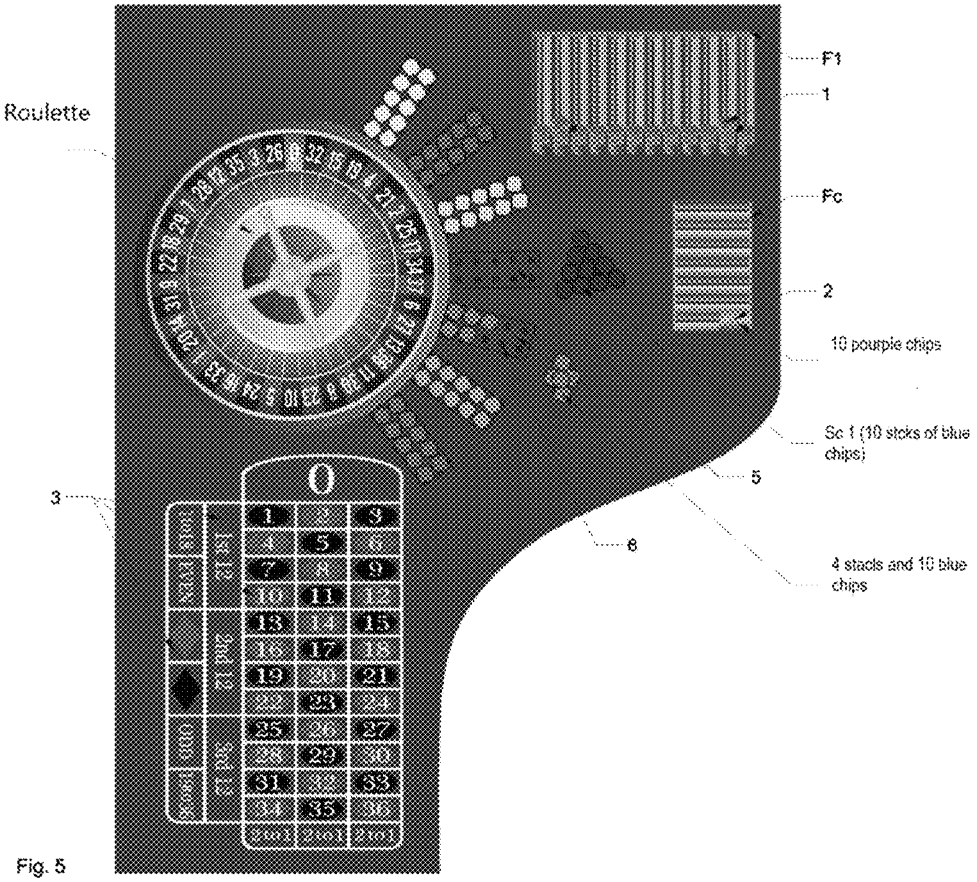
FIG. 5: View placement of sensors of the photoelectric system for the monitoring of a game with colour tokens at the card games.
Figure 6:
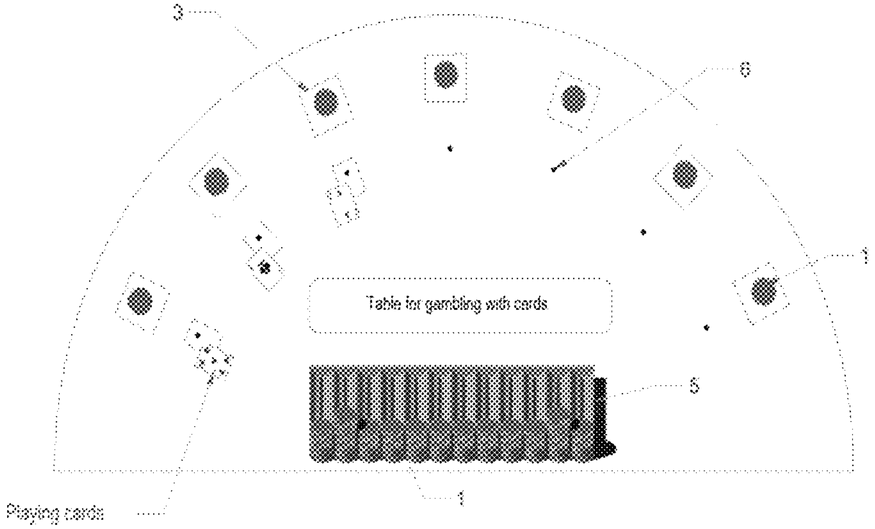
FIG. 6: View placement of sensors of the photoelectric system for the monitoring of betting boxes at the card games.

The photoelectric system for the optimisation of monitoring of a game with tokens used in a casino, according to the invention, is comprised of a base subsystem (S1) known in itself—FIG. 1, and respectively of five subsystems that interact with the former—FIG. 2. respectively a subsystem (S2) for the identification of counterfeit tokens, a subsystem (S3) for generating holograms, a subsystem (S4) for automatic generating the jackpot, a subsystem (S5) for drying the dealer's palms and a subsystem (S6) for generating a sound synchronized with the movement of the token in the electronic tray/float respectively.

The subsystems S2 . . . S6 are exercising a synergistic action over the basic subsystem S1 by:

- ensuring extended control in the monitoring system, of any attempt to influence the integrity and fairness of the gaming, through the identification of the players, identification of the counterfeit tokens, avoiding unauthorized movements of the dealers with the excuse of sweating palms when drying theirs palms "on the table";
- excluding previous arrangements due to a random allocation of dealers based on an automatic distribution, excluding the human error in jackpot generation by an electronic calculation of the amount played in the betting box, and excluding the manual data entries;
- ensuring direct interaction with human factor by generating holograms with winners, last winning bets, polifonic sounds associated with tokens input/output.

The base subsystem (S1) is made up of several floats F1 . . . Fn, each with 1 . . . n rows of value tokens (1), 1 . . . n rows with colour tokens (2) and 1 . . . n betting boxes (3) from the cards games. Each of the floats F1 . . . Fn is provided with a concave optic guide (4) in which an electronic module (5) with photoelectric sensors (6) on each token is mounted.

On one side of the float F1 . . . Fn is placed one own light source (7) constituted by a series of LEDs in infrared, one LED for each token. The light source (7) can have the wavelength from visible, infrared or ultraviolet spectrum, depending on the optic sensors used.

The concave optic guide (4) facilitates both the propagation of light from the source (7) as well as reflexion and diffraction phenomena.

On the other side part of the float F1 . . . Fn there are colour sensors (8) placed which confirm that all tokens (2) are of the same colour.

The electronic module (5) is equipped with colour sensors (8) for the counting and identification of the tokens' colour (2), of the value of the tokens (1) and of the value of the betting boxes (3) as well as a microcontroller (9) that takes over the information from the sensors, calculates the balance at the game table and assigns it to the dealer C1 . . . Cn present at game tables.

The microcontroller (9) from each electronic module (5) of each float F1 . . . Fn makes the acquisition of data as well as their processing and transmission to a central unit (CU) through a central switch (CS). In this microcontroller (5) there is installed a dedicated software application which has the role to store all information in a central database (CD) to allow both the monitoring of the game table, in real time, and the generating of reports necessary to the casino management team. Following the real-time analysis of data and of the statistic information taken from the central unit (CU) decisions for optimal reallocation of dealers to the game tables can be taken.

In the same time, the decisions and all that represents processing of data are sent to the central unit (CU) for their storage and subsequent analysis.

The optic sensors (6) for counting the tokens are placed at equal distance, one for each token in slots (not presented in the figure) placed at the bottom of the sensors series, delivering an electric signal depending on whether or not it detects a token next to it.

The sensors (8) for the identification of the colour of the tokens are placed on the side part of the float F1 . . . Fn, the one opposed to the light source (7), for recognising the colour of the token respectively the denomination associated based on colour. Information on colour from the sensors (8) is taken over by the microcontroller (9) through a serial communication bus type 12C.

The electronic module (5) takes over the signals from the optic sensors (6) and from the colour sensors (8) and adequately processes them via the central unit (CU).

The electronic subsystem (S1) can comprise of a video camera (15) for the facial recognition and of a software module, known in itself, which allow the identification of player and a control access module of the dealer, equally known in itself, once he/she enters the premises.

Hereby below there is presented an example of executing the subsystem for the monitoring of colour tokens from the roulette games, according to the invention.

It is known that, at roulette games, in addition to the float F1 . . . Fn in which the value tokens (1) exist, there are also other types of tokens, namely colour tokens (2) which stay only in formation of 13 each of 20 tokens each and which are named "stack" SC1 . . . SCn (1 stack=20 colour tokens (2)), tokens (2) that receive a certain value depending on the denomination the player wants to play on.

One roulette has in principle 7 colours of 10 stacks each.

For example, the brown colour of 5/token, 1 brown stack=100 tokens.

It is also known that, at roulette game, one way to monitor the colour tokens (2) is achieved through the so-called chipping machines ("Chipper Champ 2 by TCS John Huxley"). These tokens collecting machines contain colour sensors. They are mounted at the roulette table in the area dedicated to the collection of tokens the players placed their bet on.

This solution is good but in the same time very expensive.

One alternative for this monitoring system is the system according to this invention which contains one assemble of 10 optic sensors (6), one for each stack (13).

Above the game table there is installed a device emitting light in infrared spectrum.

In order to be able to monitor the colour tokens (2) in number less than 20, it is necessary to mount a system for the monitoring of tokens according to the invention to contain 7 series of optic sensors (6) and 7 series of colour sensors (8), one for each colour.

The condition is that the series of sensors (6) and (8) must contain 20 photoelectric sensors, one for each colour token, while the dimension of the series must be exactly of 20 tokens.

The signals from the sensors (6) and (8) for the detection of stacks are processed by the microcontroller (9) and by the central unit (CU) respectively, enabling thus the monitoring of the flux and of the number of colour tokens from the roulette game.

Herein below there is presented an example of executing the subsystem for the monitoring of the betting boxes at the card games, as per the invention.

It is known that, at the card games, there are drawing "boxes" (3) dedicated to betting.

The system, according to the invention, provides for one photoelectric sensor (6) for each box (3) in part, which supports the monitoring of the number of played boxes.

Above the game table, there is installed a device emitting light in infrared spectrum.

At the moment when value tokens (1) are placed on the betting box, the dealer who deals the cards must place the first card offered to the player on the photoelectric sensor (6) so that the central unit (CU) is able to register the betting box as opened.

The signals from sensors (6) for the detection of boxes (3) for betting are taken over by the microcontroller (9) and adequately processed by the central unit (CU).

This is how the number of opened/closed boxes at the playing tables are monitored.

The subsystem allows the implementation of the original procedure for the distribution of dealers at the tables without the manager's (pit boss) intervention with the scope of fairly distributing the dealers based on the balanced obtained by each dealer at the playing tables.

Thus, it is known that the dealers staff is allocated in work shifts to cover the whole period when the casino is open, the dealers being distributed at the tables by the pit boss on hourly basis intervals both to secure their replacement at the tables and to offer the dealers equal resting time. Depending on the workload of the casino, the dealers spend more or less time at the gaming tables, however in principle the dealer changes tables at 20 or 30 minutes intervals.

Pit boss distributes the dealers to the tables and marks them in a table or paper form or in an electronic device like tablets for keeping evidence. Based on the above-mentioned procedures, the system calculates the balance of each dealer who works at the tokens device. The system is provided for each table with an access control module, known in itself, with which the dealers register themselves in the device.

Before starting work with the tokens from the device, the dealer has its balance at the gaming table calculated both on the moment he/she registered him/herself in the device and on the moment when the following dealer registers with the device.

It is also known that the system calculates the value of each payment at the individual betting boxes (3). The holders present at the table can be attributed to the betting boxes, by selecting the betting box from the interface of the software application dedicated to the respective table which accesses the database of the casino reception with the players present in the casino.

Based on the above depicted, namely if the dealers' working schedule is introduced in the software application of the subsystem monitoring the value tokens and the betting boxes (3), based on a software logic, the allocation of dealers at the gaming tables can be automatically generated, offering thus the players the possibility to play with different dealers, the latter being replaced based on the above-mentioned software algorithm.

The implementation of the procedure makes it necessary to use monitors to show the dealers and the gaming tables where these are to perform their activity, with a software interface at each gaming tables, known in itself.

In the first procedural stage, the specific working day is selected from the employees' schedule, then the dealers list with work shifts on that day is shown and afterwards the opening gaming tables are selected.

If, for example, there are one table and two dealers, the system selects for the opened table one available dealer located in the resting room. For the next twenty minutes, the system selects one available dealer in the resting room to replace the one already at the opened table and afterwards the procedure repeats itself.

In case of 2 tables and 3 dealers, the algorithm functions as follows:

TABLE 1

| | | |
|---|---|---|
| Step 1: | the system selects: | position 1 and allocates the M1 gaming table;<br>position 2 and allocates the M2 gaming table;<br>position 3 remains in break; |
| Step 2: | the system selects: | position 3 and allocates the M1 gaming table;<br>position 1 and allocates the M2 gaming table;<br>position 2 remains in break; |
| Step 3: | the system selects: | position 2 and allocates the M1 gaming table;<br>position 3 and allocates the M2 gaming table;<br>position 1 remains in break; |
| Step 4: | the system selects: | position 1 and allocates the M1 gaming table;<br>position 2 and allocates the M2 gaming table;<br>position 3 remains in break; |

And then the 4-step procedure repeats itself, according to the situation as shown in FIG. 12.

Now, in case there are 3 tables and 5 dealers, the algorithm applies according to FIG. 13.

In this manner, a repetitive system may be conceived depending on number of tables and of dealers respectively that are available throughout a playing day, as shown in FIG. 14.

The presented procedure is applicable to a casino that would function in ideal conditions, namely without the player being able to request the replacement of the dealer or to request the dealer to leave the table. In this case, the application allows a command to be sent to the system in order to bring a dealer back from the break and to send the replaced one to the break, without taking into account the dealer automatic allocation pattern.

Figure 11:
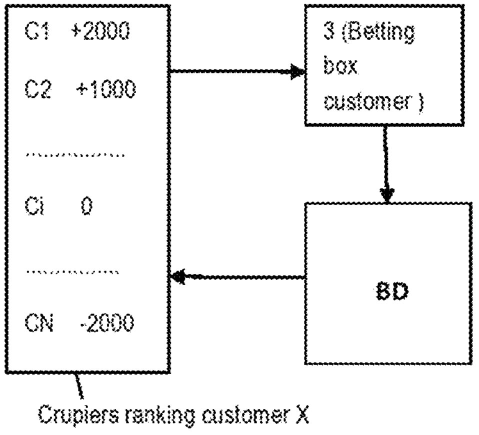
FIG. 11: Allocation of dealer for players formation.

Taken into consideration that the system has information on the presence of the players and on the dealers at the gaming tables, the system can implicitly associate the players present at the table with the balance of the dealer at the end of the work shift at the table (20 or 30 minutes), as follows:

The dealer allocates the player to a betting box;

The system verifies in BD—FIG. 11—the balances of the dealers who interacted with the selected player at the gaming table where the player's betting box was allocated and checks whether there are present the dealers that could be part of the possible ranking (player vs. dealer/table).

The system searches for the list of dealers present and, after it establishes the ranking, three dealers dealer categories shall result namely:

1. Dealers with positive balance;
2. Dealers with negative balance;
3. Dealers with 0 balance.

The previous procedure continues on condition that on the same table the same dealer does not return earlier than 40 minutes.

In case the system disposes of video camera (15) and of facial recognition module, it shall allocate the recognized player as per the respective procedure to the betting box.

The subsystem (S2) for the identification of counterfeit tokens, as per this invention, allows the identification of the edge lettering on the side part of the token, in real time, knowing that on the edge shape of the tokens used in a casino there is a specific model, design, that sometimes is stamped on all tokens of same value (for example, all tokens of 100), executed by the manufacturer at casino's choice.

For checking these normal tokens (without RFID) there are UV lamps for identifying the counterfeit tokens, that also have a design printed with special colourless paint and which reacts to UV light.

This technique is presently used by means of applying the design with colourless paint both on the edge shape as well as on the two faces of the token.

There are also known systems with video camera mounted above the table and which allow the recognition of colour of the tokens and which are able to calculate the total value of the float but which do not identify whether the tokens are counterfeit or not.

This system is influenced by the dealer's hands which works above the float and it basically cannot present accurate and real-time balance as the information is provided solely when the dealer ceases to work above the float.

The subsystem (S2) for the identification of counterfeit tokens, as per the invention, is based on the technical solution for finding the tokens without being influenced by the dealer' hands positioning, by using a pair of video cameras (10) for each row of chips in the concave guide, namely one camera mounted on each end of the tokens row. The video cameras are positioned at a variable height depending on the sensitivity of the camera lens, the image processor used and the size of the tokens so that from the height and positioning angle of the camera to make visible the pattern on the edge of each token. The counterfeit tokens identification module (MJC) is implemented through a dedicated software specialized for video camera, for the real time identification of counterfeit tokens, directly from the gaming table.

This way there is no longer necessary for the token to reach the cashier office and to be subject to optic control of the cashier, being thus solved the technical aspect of identification of counterfeit tokens directly at the gaming table.

The procedure to identify counterfeiting tokens in the MJC module resides from the premise that the concave guide (4) is fitted with photoelectric sensors (6) on the bottom side namely where the token becomes one common part with the concave guide (4).

On one side, there are colour sensors mounted (8) placed on one third on the side of the concave guide. On the side, there is mounted the infrared light (7) which is in direct rapport to the photoelectric sensors.

On the other side, it is mounted the visible light which is in direct rapport with the colour sensors.

Figure 7:
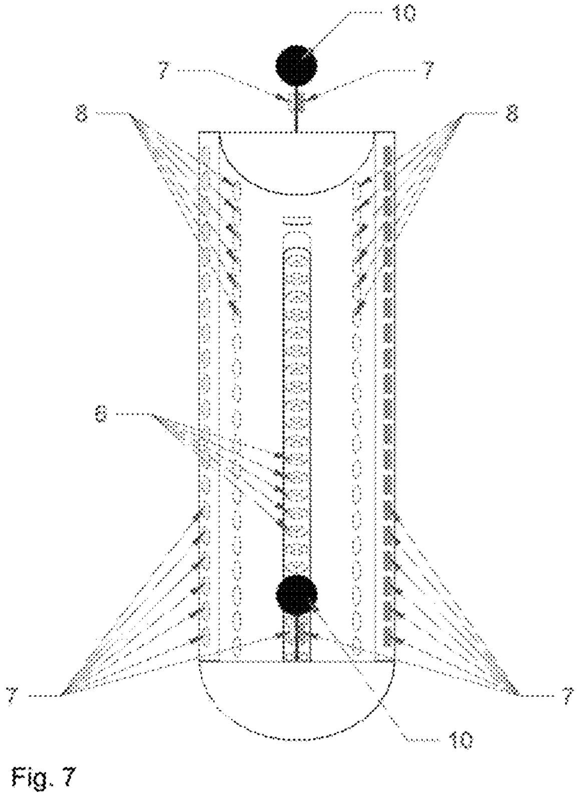
FIG. 7: Placement of video cameras in the concave guide.
Figure 8A:
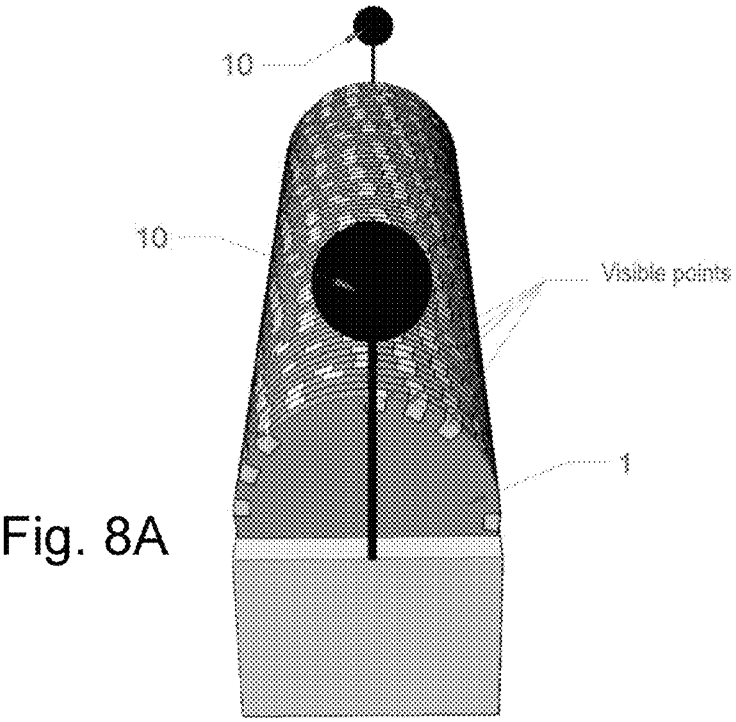
FIG. 8A: Points visible on a token in general.

At both ends of the guide, there is mounted a video camera (10—FIG. 7) and the module MJC shall process the information by calculating the distance between the two or more coordinates located on the margin namely one the token edge (FIG. 8A).

Figure 8B:
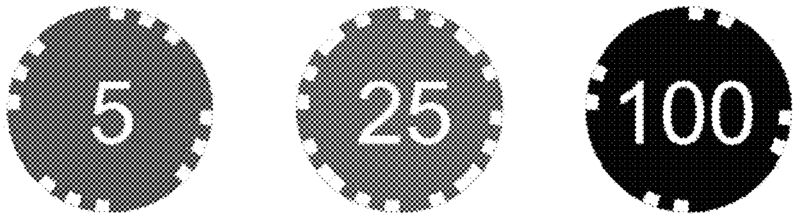
FIG. 8B: Points visible on value coins.

These drawings located on the edge of the token represent an identical pattern for each denomination (FIG. 8B) (for example, for 5 value token there is one pattern, for 25 value token another pattern and for the 100-value token another third pattern).

The drawing mandatory for all tokens in the same denomination must be the same, implicitly also the distance between the coordinates. This pattern placed on the edge of the token with the specific drawing is special construed against counterfeiting and there are also used other invisible colours that become visible against specific light spectrum.

Figure 9:
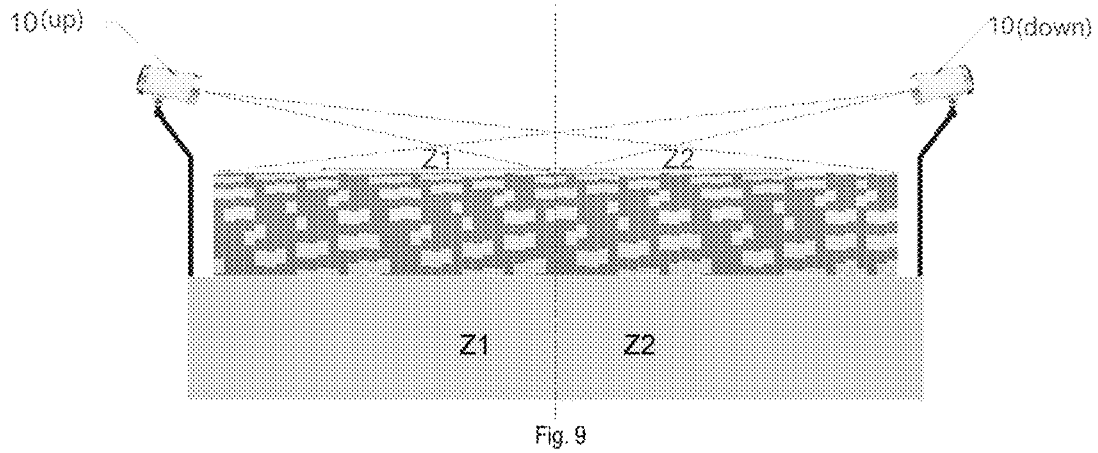
FIG. 9: Allocation of concave guide to verification areas.
Figure 10:
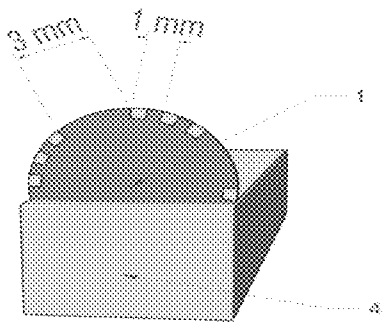
FIG. 10: Measurable type on tokens.

If the concave guide is provided with a light that makes visible the pattern existing on the edge of the token, the video camera will be able to measure the distance between two or more coordinates located in the pattern of the drawing placed on the margin (token's edge). It is necessary to mount two video cameras (10) on the concave guide (4) namely on the two ends of the concave guide (4). It is necessary to mount it suspended because, for example, camera 10 (*up*) checks the tokens from Z2 area whereas the camera 10 (down) checks the tokens from Z1 area of the concave series—FIG. 9, so that part of the pattern shall be seen on the edge of the token in the area that remain visible. MJC shall process and check at least a distance between two coordinates in the system and shall do the verification directly at the concave guide (4) located at the gaming table.

In this way, the checking procedure comprises of the following stages:

- the token is placed in the concave guide (4) and the photoelectric sensor (6) marks the presence of the token;
- the colour sensor confirms the authenticity of the colour of the token and, implicitly, its value;
- the video camera sensor measures the pattern located on the edge of the token and confirms the authenticity of the token.

The concave guide (4) is provided with infrared light for photo sensors, LED light for colour sensors and ultraviolet light for invisible paint with which the patterns created on the edge of the token may be seen.

The subsystem (S3) generating holographic images has, as entry data, the signals from the tokens that the individually monitored by means of a photoelectric sensor (6) and which is comprised of a device that generates holographic images (11) and a module (MGH) generating holographic images what allows, when a jackpot bonus is offered at the live tables, the automatic generation of a hologram, coordinated with live bets, which reproduces the winning player's face, the last bet at the table, casino commercials and other relevant holographic images.

The subsystem (S4) for automatic generating jackpot following the bets placed at live tables is in permanent dialog with the base subsystem (S1) which generates a balance for each betting box (3) by means of monitoring the tokens that enter and exit the floats (F1 . . . Fn) at each betting session in real time. Based on this information offered by the subsystem S1, the subsystem S2 permits by the implementation of a dedicated module, the generation of jackpot at the table by retaining a mathematical percentage of win/loss, increase a percentage from each bet placed at the betting box, so that the table actually becomes a slot machine by automatic jackpot generation. The expected result is essentially that the table with 7 bet boxes will become a table with 7 slot machines that will operate individually and will calculate and keep a mathematical percentage on each box in each individual bet.

The subsystem (S4) structure includes a jackpot display (12) installed at the gaming table and a MGJ module generating automatic jackpot. The subsystem displays the jackpot and the amount increased in jackpot following the bets placed shall be calculated with support of the MGJ module and thus, when the jackpot is offered, the display shall show the amount and the winning betting box. In the current context, each betting box (3) shall be deemed a slot machine and basically if, for example, the table has seven betting boxes (3), the subsystem shall offer the jackpot to a single box similar to the situation when the jackpot is offered at slot machines and one slot machine wins the displayed jackpot where a group of more than one slot machines participates.

Based on the fact that the amount from each betting box is known, the following procedure, with the support of the guide/concave guides and of the sensors fitted next to the betting boxes, is considered:

the token that enters/exits the concave guide is paid from the winning box;

the playing cards located on the sensor attached to the betting box where the token was paid are taken;

the system allocates the token(s) from the guide/concave guides to the sensor which becomes uncovered by the playing card;

knowing the value of the token(s) assigned to the betting box, a percentage from the token(s) value may be increased with in the jackpot type bonus system.

For implementing the bonus system, it is provided the mounting of a display at the gaming table and/or virtual reality (hologram) where it will be displayed the total value of the prices based on a principle similar to the one applicable to slot machines. These jackpots and prices shall be granted and generated based on placed bets, according to the previous mentioned procedure.

When the increase/increment percentage is reached, based on pre-set parameters, it will be randomly chosen the winning betting box where the amount, from the device fitted at the gaming table, shall be paid, thus being checked also the amount paid by the jackpot against the tokens taken out from the concave guides.

Based on this system, it is thus possible to generate jackpot at the card table and thus the jackpots at the live tables can be connected with slot machine type systems.

The above described method shows that each betting box can individually participate at the jackpot type bonus system that is similar to the one applicable to slot machines where each slot machine participates individually to the prices pre-set and offered by the system.

Consequently, taken into account that one can obtain information from each betting box, such data may be treated at individual level as a (participating) slot to jackpot and thus the betting boxes from live casino can participate and be connected in real time to slot machine system, allowing thus a more interactive play for the players as well as more players participating at jackpots.

The subsystem (S5) for drying the dealers' palms is designated to prevent the dealer's tendency to wipe them off the table or the clothes when hands are sweat and to prevent thus the risk of inserting tokens into own pockets, given that as a result of implementing such method basically eliminates the possible excuse of the dealer to take hands off above the table.

To this end, one miniature ventilator (13) is installed on the side parts of the float (F1 . . . Fn), which is controlled by the activation module (MA) which blows air so that the dealer can dry its palms.

The MA activation module allows either for the individually controlled activation by human factor intervention or its activation following the detection by photoelectric sensors (16) of the ventilators, if climate factors impose the need to command the ventilators.

The subsystem (6) generating sound synchronized with the movement of token in the electronic float is based, as it the case for the base S1 subsystem, on the fact that the tokens are individually monitored, by installing one photoelectric sensor (6) for each token. When the token is taken out or inserted in the float (F1 . . . Fn) with the help of a diffusor (14) connected to a sound generating module (MGS), it is thus possible for one or more polyphonic sounds to be generated upon each entrance or exit of the token into/from the device (for example, chi chi ching) or when a certain amount, calculated/pre-set by the system, is reached.

Consequently, the system in its entirely offers better experience for the player, with sensation similar to that when playing the slot machines.

The invention claimed is:

1. A system for monitoring of a chip game on a gaming table comprising:

an electronic module comprising a microcontroller and at least one float (F1 . . . Fn) each containing a token series 1 . . . n rows with different color tokens, wherein each color represents a value of the respective token, 1 . . . n betting boxes from playing cards, wherein each of the floats (F1 . . . Fn) is fitted with a concave guide in which said electronic module is mounted with photoelectric sensors on a bottom side of the concave guide and adjacent to the tokens for identification of the different color tokens in each float, one side of the floats (F1 . . . Fn) having a light source comprised of a series of infrared LEDs, one infrared LED for each token, the wavelength of each infrared LED being in a visible, infrared or ultraviolet spectrum, depending on the type of photoelectric sensor used, an other side of the floats (F1 . . . Fn) being fitted with color sensors that identify the color of the color tokens and are used to confirm that all color tokens are of the same color, wherein the color sensors are included in the electronic module wherein said microcontroller is configured to process signals from the photoelectric sensors and the color sensors to identify and count the token's color, determine the values of each different color tokens, the value of the betting boxes, provide a game balance on the gaming table, and monitor the gaming table in real time, two video cameras for generating a video signal suspended from the at least one float, wherein each video camera is connected above each of said at least one float;

said microcontroller configured to identify counterfeit tokens located on the gaming table without being influenced by a dealer's hands positioning from the generated video signal, a holographic display configured to display holographic images, wherein the microcontroller is configured to automatically generate a jackpot based on bets placed in real time at the gaming table;

a jackpot display and a MGJ module generating an automatic jackpot.

2. The system according to claim 1, further comprising:

a ventilator configured to dry a dealers' wet palms so as to avoid a dealer's tendency to wipe the hands off on the table or on clothes, and thus avoiding unauthorized movement of the dealers and preventing any attempt to influence integrity and fairness of the gaming table.

3. The system according to claim 2, further comprising:

a sound generator configured to generate sound synchronized with movement of the color tokens from the at least one float, sounds that facilitate a direct interaction with human presence in the casino by generation of the holograms with winners, last winning bets, polyphonic sound associated with inputs and outputs from the system of any type of token.

4. The system according to claim 1, further comprising:

an infrared light source directed to said different color tokens wherein the infrared light source makes visible patterns on the edges of each of said different value tokens; wherein the two video cameras are positioned at an angle to capture edges of tokens;

the microcontroller is configured to identify the counterfeit tokens located on the gaming table and identify the counterfeit tokens based on calculating a distance between two or more coordinates located on the drawing located on the edge of the different color tokens wherein each denomination of the different color tokens is represented by an identical pattern used for anti-counterfeiting measures.

5. The system according to claim 1, wherein said microcontroller is configured to monitor in real time at least one float and the betting boxes, provide in real time the game balance for each betting box, and wherein said jackpot display is configured to receive inputs from the microcontroller, and said automatic jackpot generating module (MGJ) is configured to calculate a mathematical percentage of an actual win/loss result, and generate the automatic jackpot by increasing a percentage of each bet.

6. A system for monitoring of a chip game on a gaming table comprising:

an electronic module comprising a microcontroller and at least one float (F1 . . . Fn) each containing a token series 1 . . . n rows with different color tokens, wherein each color represents a value of the respective token, 1 . . . n betting boxes from playing cards, wherein each of the floats (F1 . . . Fn) is fitted with a concave guide in which said electronic module is mounted with photoelectric sensors on a bottom side of the concave guide and adjacent to the tokens for identification of the different color tokens in each float, one side of the floats (F1 . . . Fn) having a light source comprised of a series of infrared LEDs, one infrared LED for each token, the wavelength of each infrared LED being in a visible, infrared or ultraviolet spectrum, depending on the type of photoelectric sensor used, an other side of the floats (F1 . . . Fn) being fitted with color sensors that identify the color of the color tokens and are used to confirm that all color tokens are of the same color, wherein the color sensors are included in the electronic module wherein said microcontroller is configured to process signals from the photoelectric sensors and the color sensors to identify and count the token's color, determine the values of each different color tokens, the value of the betting boxes, provide a game balance on the gaming table, and monitor the gaming table in real time, two video cameras for generating a video signal suspended from the at least one float, wherein each video camera is connected above each of said at least one float;

said microcontroller configured to identify counterfeit tokens located on the gaming table without being influenced by a dealer's hands positioning from the generated video signal, a holographic display configured to display holographic images, wherein the microcontroller is configured to automatically generate a jackpot based on bets placed in real time at the gaming table;

a jackpot display and a MGJ module generating an automatic jackpot;

a ventilator configured to dry a dealers' wet palms so as to avoid a dealer's tendency to wipe the hands off on the table or on clothes, and thus avoiding unauthorized movement of the dealers and preventing any attempt to influence integrity and fairness of the gaming table;

a sound generator configured to generate sound synchronized with movement of the color tokens from the at least one float, sounds that facilitate a direct interaction with human presence in the casino by generation of the holograms with winners, last winning bets, polyphonic sound associated with inputs and outputs from the system of any type of token.

7. A method for implementing a system for monitoring of a chip game on a gaming table, the system comprising:

an electronic module comprising a microcontroller and at least one float (F1 . . . Fn) each containing a token series 1 . . . n rows with different color tokens, wherein each color represents a value of the respective token, 1 . . . n betting boxes from playing cards, wherein each of the floats (F1 . . . Fn) is fitted with a concave guide in which said electronic module is mounted with photoelectric sensors on a bottom side of the concave guide and adjacent to the tokens for identification of the different color tokens in each float, one side of the floats (F1 . . . Fn) having a light source comprised of a series of infrared LEDs, one infrared LED for each token, the wavelength of each infrared LED being in a visible, infrared or ultraviolet spectrum, depending on the type of photoelectric sensor used, an other side of the floats (F1 . . . Fn) being fitted with color sensors that identify the color of the color tokens and are used to confirm that all color tokens are of the same color, wherein the color sensors are included in the electronic module wherein said microcontroller is configured to process signals from the photoelectric sensors and the color sensors to identify and count the token's color, determine the values of each different color tokens, the value of the betting boxes, provide a game balance on the gaming table, and monitor the gaming table in real time, two video cameras for generating a video signal suspended from the at least one float, wherein each video camera is connected above each of said at least one float;

said microcontroller configured to identify counterfeit tokens located on the gaming table without being influenced by a dealer's hands positioning from the generated video signal, a holographic display configured to display holographic images, wherein the microcontroller is configured to automatically generate a jackpot based on bets placed in real time at the gaming table;

a jackpot display and a MGJ module generating an automatic jackpot the method comprising:

(1) identifying a player through registration at a casino or by using a video camera provided with facial recognition software;

(2) automatically allocating dealers based on a results/balance sheet obtained by dealers at the gaming table;

(3) verifying by one of the dealers through the software application;

(4) identifying possible counterfeit tokens by introducing each token in the concave guide corresponding to a pre-established one of the denominations at a beginning of a day and which sets out presence of the color and possible counterfeit element for each token; and (5) automatically generating a jackpot by retaining a mathematical percentage of win/loss increment from each bet placed at the betting box, so that the table becomes a slot machine.

8. The method according to claim 7, wherein the system further comprises:

a ventilator configured to dry a dealers' wet palms so as to avoid a dealer's tendency to wipe the hands off on the table or on clothes, and thus avoiding unauthorized movement of the dealers and preventing any attempt to influence integrity and fairness of the gaming table.

9. The method according to claim 8, wherein the system further comprises:

a sound generator configured to generate sounds synchronized with movement of the color tokens from the at least one float, sounds that facilitate a direct interaction with human presence in the casino by generation of the holograms with winners, last winning bets, polyphonic sound associated with inputs and outputs from the system of any type of token.

10. The method according to claim 9, wherein the method further comprises:

generating the polyphonic sound, according to pre-established rules, upon entrance or exit of any type of token from its position.

11. The method according to claim 10, wherein the method further comprises generating the hologram and a complex image comprising a name of a winner when the winner is announced.

12. The method according to claim 11, wherein the method further comprises drying the dealer's palms by use of the ventilator.

13. The method according to claim 7, wherein:

for the implementation of step (2) for a rapid and efficient automatic allocation of the dealers based on each interaction of each dealer versus a player at every 30-minute interval, depending on a balance of the dealer versus the player or a team, to maintain a randomness of the players against each dealer, and maintaining equal chances against the players, the method further comprising:

selecting a workday from an employees' program;

displaying a list of the dealers together with work shifts on the selecting workday, and selecting tables to be opened;

registering by the dealers themselves in the first subsystem through a control access module;

before the value and color tokens are attached to the claimed system, the dealer calculates a balance sheet for the gaming table in place when dealer self-registers in the device and when a next dealer self-registers;

based on information relating to the presence of players and of the balance sheets of the dealers obtained with the players at various gaming tables and games, then:

a) allocating, by the dealer, one player for each betting box;

b) verifying by the system in data base DB, of the balance of the dealers who interacted with the selected player at the gaming table where the player's box was allocated and listing the dealers to be included on a ranking list;

c) searching by the system the list of present dealers and, after the ranking is established, the following situation on dealers will result:

dealers with a positive balance;

dealers with a negative balance;

dealers with zero balance;

repeating the whole procedure with a condition that a dealer does not return at the same gaming table prior to 40 minutes;

in case the facial recognition module is used, the system allocates a previous recognized player to the betting box.

14. The method according to claim 7, wherein:

for the implementation of step (4) for the identification of counterfeit tokens without any potential irregular handling of tokens by an incorrect dealer with the method further comprising:

inserting the color token in the concave guide and sensing by the photoelectric sensors the presence of the color token;

confirming, by the color sensors, the authenticity of the color of the color token and the denomination of the token;

generating by the two video cameras mounted at each of the two ends of the concave guide a signal that enables the identification of the tokens from areas opposite to the concave series so that part of the pattern from the edge of the value token remains visible; and measuring, by the sensor of each of the video camera mounted at both ends of the guide, the pattern on the edge of the value token and confirm an authenticity of the value token by measuring a distance between one or more coordinates located on a drawing on a margin on the edge of the value token, the drawing representing a pattern that is identical for all tokens in the same denomination.

15. The method, according to claim 7, wherein:

the implementation of step (5) for the automatic generation of a jackpot, based on the bet calculation and retaining a mathematical percentage of the bet played on the betting box, and transforming factually the betting box into a slot machine, has as a starting point a known amount coming from each betting box with the support of the guide/concave guides and of the sensors mounted next to the betting boxes, comprising:

paying the token that enters/exits the concave guide from the winning box; and removing the playing cards from the betting box from where the token originated;

allocating, by the electronic module of the token(s) from the guide/concave guides to the sensors from which the playing cards were removed;

knowing the denomination of the token(s) allocated to the betting box, increasing a percentage from the value of the token(s) in a jackpot type bonus system; and when the increased percentage is reached, randomly selecting based on prior set parameters, a winning box from where the amount is to be paid from the device mounted on the gaming table, and verifying the amount paid by the jackpot versus the tokens taken out from the concave guides.

* * * * *